United States Patent [19]

Nakagawa et al.

[11] 4,446,840
[45] May 8, 1984

[54] EXHAUST GAS RECIRCULATION CONTROL SYSTEM FOR INTERNAL COMBUSTION ENGINE

[75] Inventors: Toyoaki Nakagawa, Yokosuka; Masao Nakajima, Atsugi; Yoshihisa Kawamura; Giichi Shioyama, both of Yokosuka, all of Japan

[73] Assignee: Nissan Motor Co., Ltd., Kanagawa, Japan

[21] Appl. No.: 441,036

[22] Filed: Nov. 12, 1982

[30] Foreign Application Priority Data

Nov. 20, 1981 [JP] Japan .................................. 56-186498

[51] Int. Cl.³ .......................................... F02M 25/06
[52] U.S. Cl. .................................... 123/571; 123/569; 364/431.06
[58] Field of Search ................. 123/571, 569; 364/431.06

[56] References Cited

U.S. PATENT DOCUMENTS

| 4,181,944 | 1/1980 | Yamauchi et al. | 123/569 |
| 4,318,385 | 3/1982 | Yamaguchi | 123/571 |
| 4,333,438 | 6/1982 | Perez et al. | 123/569 |
| 4,387,693 | 6/1983 | Romblom | 123/569 |
| 4,387,694 | 6/1983 | Yoshiba et al. | 123/569 |
| 4,388,909 | 6/1983 | Ogasawara et al. | 123/569 |
| 4,388,912 | 6/1983 | Kimura et al. | 123/571 X |

FOREIGN PATENT DOCUMENTS 57-73823  5/1982  Japan .................................. 123/569

OTHER PUBLICATIONS

Nissan Motor Company, Ltd., "1981 Datsun 810 Diesel Service Manual," 1981, pp. EC-2 to EC-8.

Primary Examiner—Wendell E. Burns
Attorney, Agent, or Firm—Lowe, King, Price & Becker

[57] ABSTRACT

An E.G.R. control system for a diesel engine is disclosed wherein a deterioration in combustion is avoided upon depressing an accelerator pedal for reacceleration after the momentary release of the accelerator pedal. An E.G.R. control unit is responsive to a load indicative signal from a load sensor and a revolution signal from a revolution sensor and generates an engine operating state indicative signal indicating that the engine operates in low load state which requires high E.G.R. flow rate. A monostable circuit, a delay circuit and a logic circuit make up a circuit means for preventing a throttle valve from being closed until the engine keeps operating in the low load state for a time longer than a predetermined time.

2 Claims, 4 Drawing Figures

EXHAUST GAS RECIRCULATION CONTROL SYSTEM FOR INTERNAL COMBUSTION ENGINE

BACKGROUND OF THE INVENTION

1. Field of the Invention

The present invention relates to an exhaust gas recirculation control system for an internal combustion engine, more particularly a diesel engine.

2. Description of the Prior Art

Exhaust gas recirculation (E.G.R.) control systems are known as a system which suppresses combustion in an internal combustion engine to reduce NOx discharged from the engine. In order to improve the constituents of exhaust gases without imparing the driveability, the E.G.R. flow rate must be appropriately controlled depending upon varying operating condition of the engine.

One of the known E.G.R. control systems for a diesel engine is described in chapter EXHAUST EMISSION CONTROL SYSTEM of a printed publication entitled "1981 DATSUN 810 DIESEL SERVICE MANUAL" printed on March 1981. This known E.G.R. control system is hereinafter described in connection with FIGS. 1 and 2 wherein FIG. 1 is a schematic illustration of the known E.G.R. control system and FIG. 2 illustrates mode of operation of the E.G.R. control system.

Referring to FIG. 1, the reference numeral 1 designates an air cleaner, the reference numeral 2 an intake passage of a diesel engine 3, the reference numeral 4 an exhaust gas passage of the engine 3. The E.G.R. control system comprises an exhaust gas recirculation passage (E.G.R. passage) 5 connecting the exhaust gas passage 4 to the intake passage 2 at a portion thereof downstream of a throttle valve 6 disposed in the intake passage 2, and an E.G.R. control valve 7. The E.G.R. control valve 7 has a valve element 7a disposed within the E.G.R. passage 5.

The throttle valve 6 is operatively connected to a throttle diaphragm 8 and actuated such that when vacuum from a source of vacuum in the form of a vacuum pump 9 develops in a pressure chamber 8a of the throttle diaphragm 8, the throttle valve 6 is closed to a predetermined partially closed position wherein the throttle valve 6 is partially closed, whereas when the pressure chamber 8a is open to the atmosphere, the throttle valve 6 is fully opened. The source of vacuum may be in the form of a vacuum tank. The presseure chamber 8a of the throttle diaphragm 8 is connected selectively to the vacuum or the atmospheric pressure under the control of a three-way throttle solenoid 11 which is operable by a E.G.R. control unit 10. The E.G.R. control valve 7 includes a diaphragm 12 for actuating the valve element 7a. When the vacuum from the vacuum pump 9 develops in a pressure chamber 12a of the diaphragm 12, the valve element 7a is lifted and the E.G.R. control valve 7 is fully opened, whereas when the pressure chamber 12a is opened to the atmosphere, the E.G.R. control valve 7 is fully closed. The pressure chamber 12of the diaphragm 12 is connected selectively to the vacuum or the atmospheric pressure under the control of a second three-way solenoid 13 which is operable by the E.G.R. control unit 10.

The E.G.R. control unit 10 receives an information relating to the operating state of the engine from a load sensor in the form of a potentiometer 14, a revolution sensor 15 and a water temperature sensor 30. The potentiometer 14 is mounted to a control lever 32 of a fuel injection pump 34. The potentiometer 14 converts the opening angle of the control lever 32 controlled by an accelerator pedal 36 into a voltage signal. The revolution speed of the engine is measured the revolution sensor 15 which picks up the engine speed by counting the number of holes formed on a pulley 38 of the fuel injection pump 34. The engine temperature is measured by the water temperature sensor 30. The E.G.R. control unit 10 operates the solenoids 11 and 13 to control the E.G.R. flow rate in three modes I, II, and II as illustrated in FIG. 2. The mode I, "HIGH E.G.R.", is obtained in the combination of closed throttle valve 6 and open E.G.R. valve 7. In the mode I, a sufficient amount of E.G.R. gas is drawn into the intake passage 2 by the vacuum created downstream of the throttle valve 6. As will be understood from FIG. 2, the mode I is selected when the engine operates in a low load operating state wherein high E.G.R. is required.

The mode II, "LOW E.G.R." is attained by opening the throttle valve 6 with the E.G.R. valve 7 kept open. The E.G.R. control unit 10 selects the mode II when the load on the engine increases.

The mode III is "Zero-E.G.R." condition and is attained by closing the E.G.R. valve 7. The mode III is selected when the engine operates in heavy or high load state.

The mode of operation is tabulated as follows:

TABLE I

| Mode | Throttle valve 6 | EGR valve 7 | EGR flow rate |
|---|---|---|---|
| I | Closed | Open | High |
| II | Open | Open | Low |
| III | Open | Closed | Zero |

The solenoid 11 is designated to connect the pressure chamber 8a of the throttle diaghragm 8 only to the vacuum pump 9 when it is off or deenergized. When it is on or energized, the pressure chamber 8a of the throttle diaphragm 8 is connected only to the air cleaner 1. The solenoid 13 is the same construction as the solenoid 11 and connects the pressure chamber 12a of the diaphragm 12 only to the vacuum pump 9 when it is off or deenergized. When it is on or energized, the pressure chamber 12a is connected only to the air cleaner 1. The relationship of the state of each of the solenoids 11 and 13 with the three modes is as follows:

TABLE II

| Mode | Sol. 11 | Sol. 13 |
|---|---|---|
| I | Off | Off |
| II | On | Off |
| III | On | Off |

With the known E.G.R. control system, when the accelerator pedal 36 is released to change the load on the engine from high load state into low load state, the throttle valve 6 is closed and the E.G.R. control valve 7 is opened to accomplish the mode I (see TABLE I). A problem encountered in this known E.G.R. control system is that composition of combustible charge is deteriorated upon depressing the accelerator pedal 36 for reacceleration immediately after the accelerator pedal 36 has been released for a moment, which occurs, for example, upon completion of a gear shifting operation during acceleration of an automotive vehicle from the standstill, resulting in the production of smoke and an increase in HC emission. This is attributed to the fact that with the diaphragms 8 and 12, the opening of the throttle valve 6 and closing of the E.G.R. control valve 7 cannot be effected as quickly as the quantity of fuel is increased, resulting in momentary shortage of intake air which creates rich air fuel mixture.

SUMMARY OF THE INVENTION

An object of the present invention is to provide an E.G.R. control system which has solved the deterioration in combustion upon depressing an accelerator pedal for reacceleration immediately after the accelerator pedal has been released for a moment, which occurs, for example, upon completion of a gear shifting operation during acceleration of an automotive vehicle from the standstill.

According to the present invention, there is provided an exhaust gas recirculation control system for an internal combustion engine having an intake passage and an exhaust passage, comprising:

a throttle valve disposed within the air intake passage for movement between a predetermined partially closed position and a fully opened position.

means defining an exhaust gas recirculation passage connecting the exhaust passage to that portion of the intake passage which is located downstream of said throttle valve;

an E.G.R. control valve having a valve element disposed within said exhaust gas recirculation passage for movement between a closed position and a fully opened position, a load sensor means for generating a load signal indicative of the state of load on the engine;

a revolution sensor means for generating a revolution signal indicative of the revolution speed of the engine;

means responsive to at least one of said load signal and said revolution signal for generating an engine operating state indicative signal indicating that the engine operates in a predetermined state wherein the E.G.R. flow rate higher than a predetermined E.G.R. flow rate is required;

means responsive to said engine operating state indicative signal for actuating at least one of said throttle valve and said valve element of said E.G.R. control valve in a direction tending to increase the E.G.R. flow rate; and means responsive to said engine operating state indicative signal for preventing said throttle valve and said valve element of said E.G.R. control valve from being actuated in said direction tending to increase the E.G.R. flow rate until the engine keeps operating in said predetermined state for a time longer than a predetermined time.

DESCRIPTION OF THE PREFERRED EMBODIMENT

Figure 1:
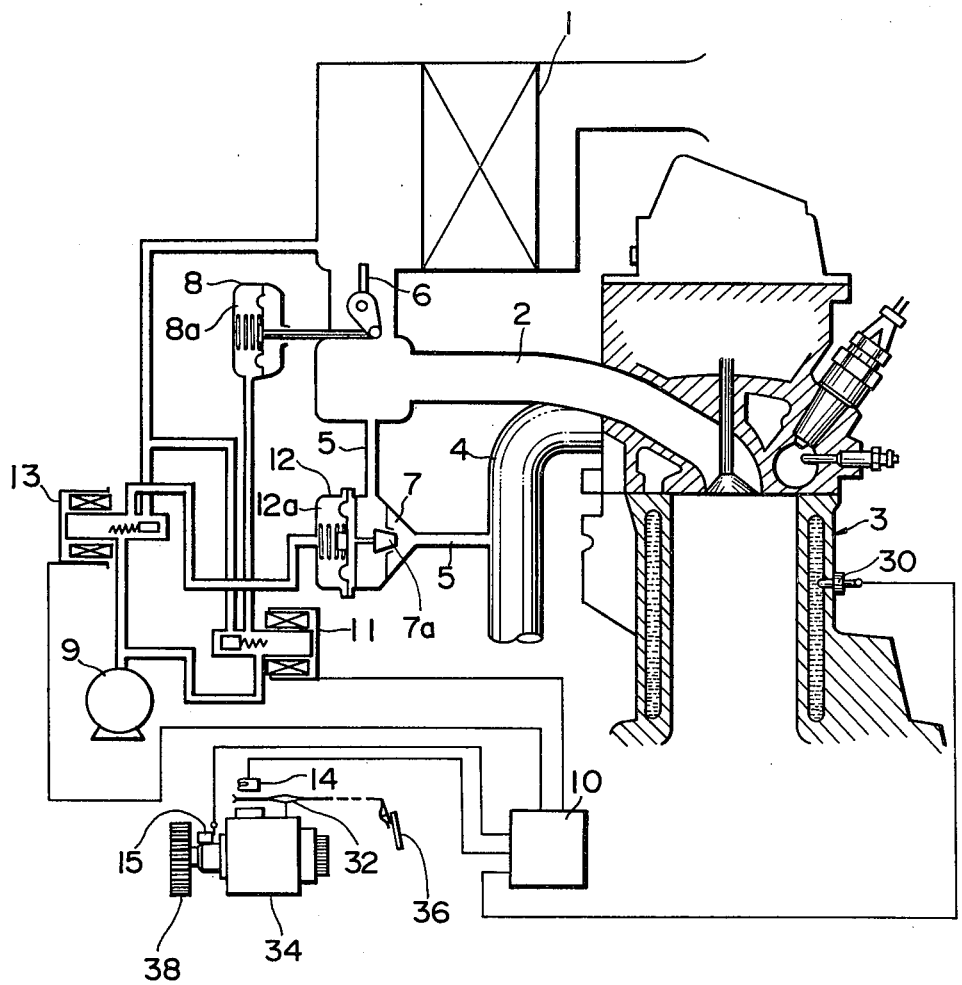
FIG. 1 is a schematic illustration of the prior art E.G.R. control system for a diesel engine which has been described.
Figure 3:
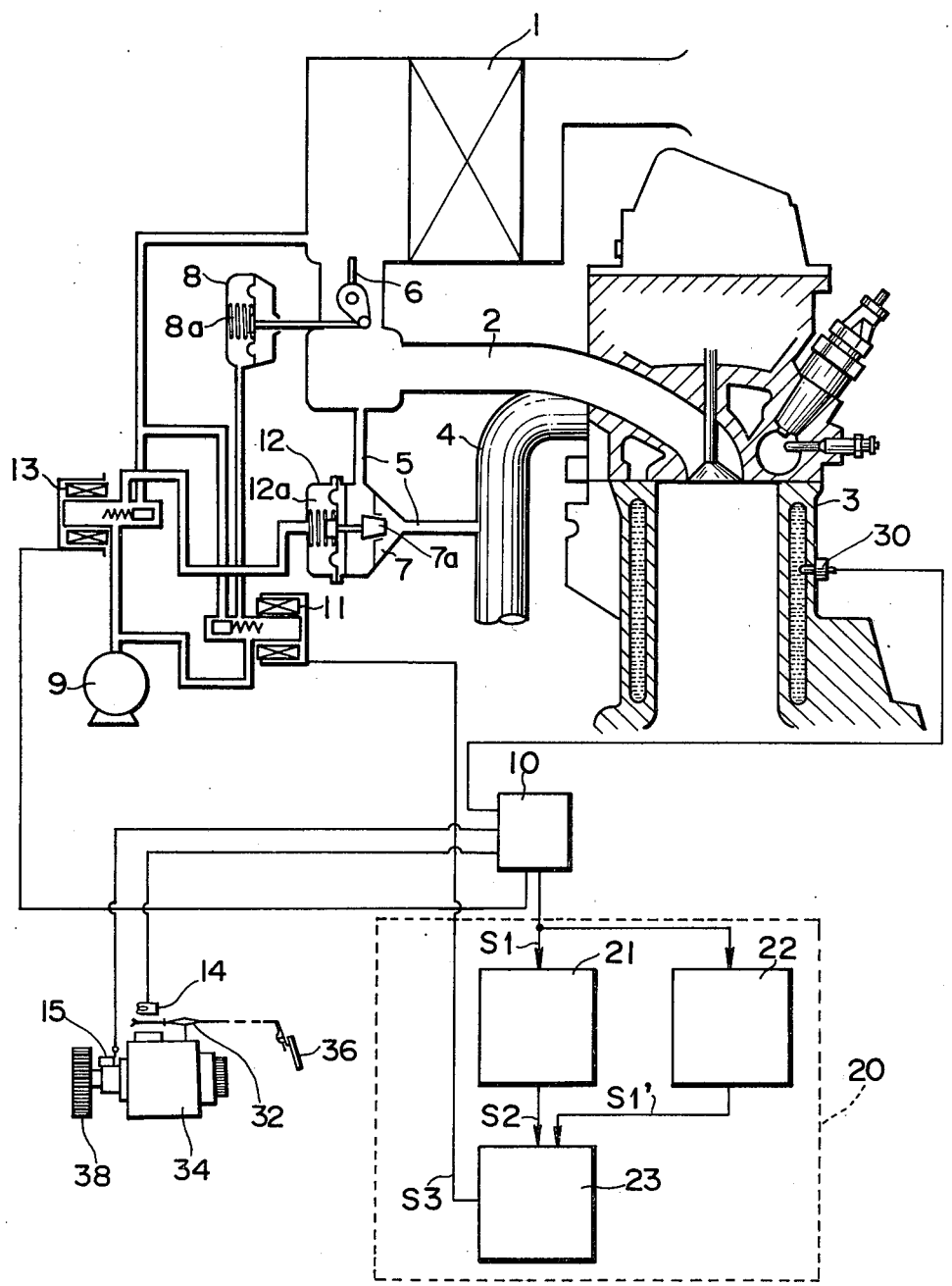
FIG. 3 is a schematic illustration of an E.G.R. control system according to the present invention.

Referring to FIG. 3, there is schematically shown a preferred embodiment of an E.G.R. control system according to the present invention wherein the same reference numerals as used in FIG. 1 are used to designate the same parts as those shown in FIG. 1.

The setting of a solenoid 11 is such that when a control signal for the solenoid 11 is in Low-level state, the solenoid 11 is not energized and connects a pressure chamber 8a of a throttle diaphragm only to a source of vacuum in the form of a vacuum pump 9, thus closing a throttle valve 6, whereas when the control signal is in High-level state, the solenoid 11 is energized to connect the pressure chamber 8a only to an air cleaner 1, thus opening the throttle valve 6. Referring to a solenoid valve 13, when a control signal for the solenoid 13 is in Low-level state, the solenoid 13 is not energized to connect a pressure chamber 12a of a diaphragm 12 only to the vacuum pump 9, thus opening an E.G.R. control valve 7, whereas when the control signal is in High-level state, the solenoid 13 is energized to connect the pressure chamber 12a only to the air cleaner 1, thus closing the E.G.R. control valve 7.

Figure 2:
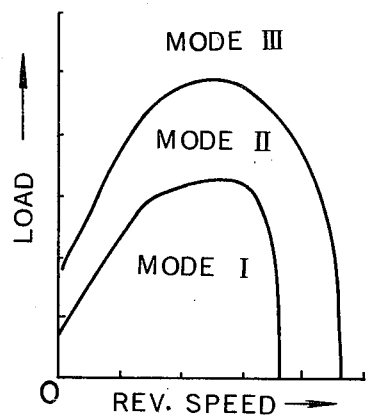
FIG. 2 illustrates the mode of operation of the system shown in FIG. 1.

The control signals for theses solenoids 11 and 13 are generated by an E.G.R. control unit 10. The E.G.R. control unit 10 receives a load indicative signal from a load sensor in the form of a potentiometer 14 and a revolution signal from a revolution sensor 15 and determines which one of the three modes I, II, and III (see FIG. 2) is required by the current operating state of the engine. The control signal for the solenoid 11 and that for the solenoid 13 take Low-level when the engine operates in low load operating state, thus attaining mode I wherein the E.G.R. flow rate is high. When the load is increased, the control signal for the level of the solenoid 11 changes to High-level to energize the solenoid 11, thus opening the throttle valve 6 to attain the mode II wherein the E.G.R. flow rate is low. When the load is increased further, the level of the control signal for the solenoid 13 changes to High-level so that both of the control signals for the solenoids 11 and 13 take High-level to energize them, thus keeping the throttle valve 6 open and closing the E.G.R. control valve, accomplishing the mode III wherein the E.G.R. flow rate is zero.

In the E.G.R. control system, the E.G.R. flow rate can be increased by actuating at least one of the throttle valve 6 and the E.G.R. control valve 7 in a direction tending to increase the E.G.R. flow rate. More particularly, the throttle valve 6 is closed concurrently with opening of the E.G.R. control valve 7.

Figure 4:
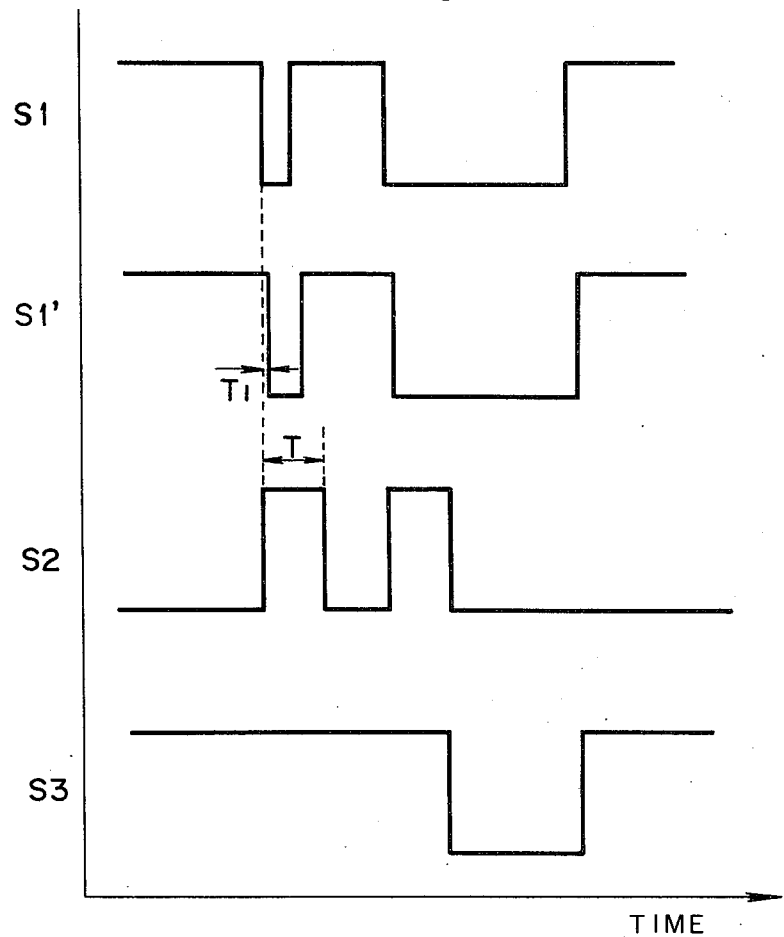
FIG. 4 is a timing diagram showing various signals used in the system shown in FIG. 3.

The E.G.R. control system comprises a transitional period circuit 20 for preventing the throttle valve 6 and the E.G.R. control valve from being actuated in the direction tending to increase the E.G.R. flow rate until the engine keeps operating in a low load state for a time longer than a predetermined time T (see FIG. 4).

The circuit 20 receives the control signal S1 from the E.G.R. control unit 10. The level of the control signal S1 changes from High-level to Low-level upon the operating state of the engine shifting into an operating state wherein high E.G.R. flow rate is required. The circuit 20 includes a monostable circuit 21 which is triggered by the change in level of the signal S1 from High-level to Low-level to generate a High-level signal S2 for the predetermined time T (see FIG. 4). It also includes a delay circuit 22 which retards the transmission of the signal S1 by a predetermined short time T1 and generates a signal S1' (see FIG. 4). The signals S1' and S2 are fed to input terminals of a logic circuit, i.e., a NOR gate, which generates a signal S3 having Low-level as long as both of its input signals take Low-level.

The solenoid 11 is operated in response to the level of the control signal S3.

When, in operation, the engine operates in an operating state which does not require high E.G.R. flow rate, for example, mode II or III (see FIG. 2), the signal S1 from the E.G.R. control unit 10 and the signal S1' from the delay circuit 22 both take High-level, causing the output signal S3 of the logic circuit 23 to take High-level, thus rendering the solenoid 11 on and energized to keep the throttle valve 6 fully opened.

When subsequently the engine operating state shifts into low load operating state which requires mode I, the level of the output signal S2 of the monostable circuit 21 rises to High-level upon the level of the signal S1 changing to Low-level. This High-level of the signal S1 is kept for the predetermined time T. If the engine operating state returns to the operating state which does not require high E.G.R. flow rate before the predetermined time T expires, the level of the signals S1 and S1' return to High-level. Therefore, the High-level of the signal S3 is maintained even if the level of the signal S1 changes to Low-level for a moment.

In this manner, the tendency of closing the throttle valve 6 is restrained upon momentary shifting of the engine operating state into the low load state requiring high E.G.R. flow rate. As a result, the deterioration of the combustion has been avoided upon depressing the acelerator pedal 36 for reacceleration after momentary release of the accelerator pedal 36.

If signals S1 persists in Low-level even after expiration of the predetermined time T, the level of the signal S2 changes to Low-level to cause the signal S3 to change to Low-level. Thus, the solenoid 11 is rendered off or deenergized, closing the throttle valve 6 to allow high E.G.R. flow rate.

The reason why the delay circuit 22 provides the delay T1 to the signal S1 to generate the delayed signal S1' is to prevent the occurrence of the event that the signal S3 drops to Low-level until the level of the signal S2 rises as high as High-level which would be caused if the signal S1 were compared with the signal S2.

In the embodiment described above, the signal for controlling the operation of the throttle valve 6 is controlled, the same result may be obtained by restraining the signal for the solenoid 13 from dropping to Low-level.

The present invention may be applied to an E.G.R. control system wherein the level of vacuum fed to a throttle diaphragm and that fed to an E.G.R. control valve diaphragm are varied precisely by solenoids which are operated by signals, each having duty ratio that is controllably varied.

As described above, according to the present invention, the deterioration of combustion has been avoided, thus providing an improved exhaust emission, a high response to acceleration and a high fuel economy.

What is claimed is:

1. An exhaust gas recirculation control system for an internal combustion engine having an intake passage and an exhaust passage, comprising:
    a throttle valve disposed within the air intake passage for movement between a predetermined partially closed position and a fully opened position;
    means defining an exhaust gas recirculation passage connecting the exhaust passage to that portion of the intake passage which is located downstream of said throttle valve;
    an E.G.R. control valve having a valve element disposed within said exhaust gas recirculation passage for movement between a closed position and a fully opened position,
    a load sensor means for generating a load signal indicative of the state of load on the engine;
    a revolution sensor means for generating a revolution signal indicative of the revolution speed of the engine;
    means responsive to at least one of said load signal and said revolution signal for generating an engine operating state indicative signal indicating that the engine operates in a predetermined state wherein the E.G.R. flow rate higher than a predetermined E.G.R. flow rate is required;
    means responsive to said engine operating state indicative signal for actuating at least one of said throttle valve and said valve element of said E.G.R. control valve in a direction tending to increase the E.G.R. flow rate; and
    means responsive to said engine operating state indicative signal for preventing said throttle valve and said valve element of said E.G.R. control valve from being actuated in said direction tending to increase the E.G.R. flow rate until the engine keeps operating in said predetermined state for a time longer than a predetermined time.

2. An exhaust gas recirculation control system as claimed in claim 1, wherein said actuating means comprises a source of vacuum, a diaphragm operatively connected to said throttle valve and having a pressure chamber, and a three-way solenoid means for connecting said pressure chamber selectively to said source of vacuum or the atmospheric pressure, and wherein said preventing means comprises a monostable circuit triggered by said engine operating state indicative signal to generate and output signal for said predetermined time, a delay circuit providing a delay to said engine operating state indicative signal to generate a delayed signal, and a logic gate receiving said output signal of said monostable circuit and said delayed signal to generate a control signal for controlling said three-way solenoid.

* * * * *